3,301,832
NITROSOPIPERAZINOTHIOAZOLES
John J. D'Amico, Charleston, W. Va., assignor to Monsanto Company, St. Louis, Mo., a corporation of Delaware
No Drawing. Filed Nov. 5, 1963, Ser. No. 321,417
12 Claims. (Cl. 260—79.5)

The present invention relates to new and useful compositions of matter. More particularly it relates to nitrosopiperazinothioazoles.

The new class of compounds may be represented by the formula

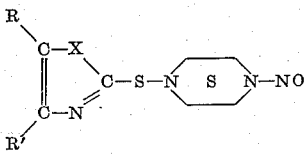

where X represents sulfur, oxygen or NH, R represents hydrogen or lower alkyl and R' represents hydrogen, lower alkyl, acetyl, lower carboalkoxy, carbamyl or carbanilino, or R and R' taken together with the vicinal carbon atoms of the azole ring represent an arylene radical of the benzene series. Suitable examples of azolyl groups include 4-ethylthiazolyl
4-methylthiazolyl
5-acetyl-4-methylthiazolyl
5-carbomethoxy-4-methylthiazolyl
5-carbethoxy-4-methylthiazolyl
4-carboethoxythiazolyl
5-carbamoyl-4-methylthiazolyl
5-carbanilino-4-methylthiazolyl
benzothiazolyl
benzoxazolyl
benzimidazolyl
4-ethylbenzothiazolyl
4-ethylbenzoxazolyl
4-ethylbenzimidazolyl
5-chlorobenzothiazolyl
5-chlorobenzoxazolyl
5-chlorobenzimidazolyl
6-ethoxybenzothiazolyl
6-ethoxybenzoxazolyl
6-ethoxybenzimidazolyl Although the nitroso radicals of nitrosamines are highly labile and susceptible to oxidation, it was found that the new compounds formed readily by condensing under mild conditions the appropriate azole or disulfide thereof in alcoholic medium with 4-nitrosopiperazine in the presence of an oxidizing agent. Suitable oxidizing agents are alkali metal hypochlorite, alkali metal hypobromite, hydrogen peroxide, chlorine, bromine, and potassium ferricyanide. The following examples illustrate the preparation of the new compounds in detail but are not to be taken as limitative of the invention.

Example 1

A mixture of 41.6 grams (0.125 mole) of 2,2'-thiobis(benzothiazole), 43.4 grams (0.375 mole—50% excess) of p-nitrosopiperazine and 300 ml. of isopropyl alcohol was stirred and heated at 50–60° C. for an hour. The reaction mixture was then cooled to 45° C. and 140 ml. (10.97 g./100 ml.—50% excess) of sodium hypochlorite added below the surface over a period of 90 minutes while maintaining the temperature at 45–50° C. Agitation at this same temperature was continued for about an hour whereupon two layers of product formed. After cooling to 10° C., 10 grams of sodium sulfite in 1000 ml. of water were added and stirring continued for 30 minutes. The precipitate was collected by filtration, washed with water until neutral to litmus and air-dried at 25–30° C. 2-(p-nitrosopiperazinothio)benzothiazole was obtained in 94.5% yield as a white solid melting at 110–111° C. after recrystallization from ethyl alcohol. Analysis gave 19.00% nitrogen (Dumas) and 22.50% sulfur compared to 19.99% nitrogen and 22.87% sulfur calculated for $C_{11}H_{12}N_4OS_2$.

Example 2

A mixture of 50.4 grams (0.25 mole) of 5-chloro-2-mercaptobenzothiazole, 57.6 grams (0.50—100% excess) of p-nitrosopiperazine and 400 ml. of isopropyl alcohol was stirred and heated at 50–60° C. for an hour. The reaction mixture was then cooled to 45° C. and 280 ml. (10.07 g./100 ml.—50% excess) of sodium hypochlorite added below the surface over a period of 2 hours while maintaining the temperature at 45–50° C. No layers formed on continued agitation for an additional hour. 5-chloro-2-(p-nitrosopiperazinothio)benzothiazole was isolated in 82.5% yield as in Example 1. It was a white solid melting at 143–145° C. after recrystallization from ethyl acetate. Analysis gave 17.77% nitrogen (Dumas) and 19.88% sulfur compared to 17.80% nitrogen and 20.37% sulfur calculated for $C_{11}H_{11}ClN_4OS_2$.

Example 3

Substituting a chemically equivalent amount of 6-ethoxy-2-mercaptobenzothiazole for the 5-chloro-2-mercaptobenzothiazole in Example 2 and stirring at 0–10° C. for 2 hours after the addition of sodium sulfite and water, 6-ethoxy-2-(p-nitrosopiperazinothio)benzothiazole was isolated in 84% yield. It was a dark gray solid melting at 104–105° C. after recrystallization from alcohol. Analysis gave 16.95% nitrogen and 20.22% sulfur compared to 17.27% nitrogen and 19.77% sulfur calculated for $C_{13}H_{16}N_4O_2S_2$.

The following examples were prepared following the procedure of Example 2:

Example 4

2-(p-nitrosopiperazinothio)-4-methylthiazole from 4-methyl-2-mercaptothiazole. It was obtained in 72.5% yield as a tan solid melting at 78–79° C. after recrystallization from alcohol. Analysis gave 25.90% sulfur compared to 26.25% calculated for $C_8H_{12}N_4OS_2$.

Example 5

2-(p-nitrosopiperazinothio)benzoxazole from 2-mercaptobenzoxazole. It was obtained in 91.5% yield as a brown solid melting at 102–103° C. after two recrystallizations from alcohol. Analysis gave 21.80% nitrogen (Dumas) and 11.67% sulfur compared to 21.20% nitrogen and 12.13% sulfur calculated for $C_{11}H_{12}N_4O_2S$.

Example 6

2-(p-nitrosopiperazinothio)benzimidazole from 2-mercaptobenzimidazole. It was obtained in 86.5% yield as a white solid melting at 198–199° C. after recrystallization from alcohol. Analysis gave 26.39% nitrogen (Dumas) and 12.33% sulfur compared to 26.60% nitrogen and 12.18% sulfur calculated for $C_{11}H_{13}N_5OS$.

Example 7

2-(p-nitrosopiperazinothio)-4-methyl-5 - carbamoylthiazole from 2-mercapto-4-methyl-5 - thiazolecarboxamide. It was obtained in 68.2% yield as a light tan solid melting at 202–203° C. after recrystallization from dimethyl formamide. Analysis gave 21.83% sulfur compared to 22.32% calculated for $C_9H_{13}N_5O_2S_2$.

Example 8

2-(p-nitrosopiperazinothio)-4-methyl-5 - anilinocarbonylthiazole from 2-mercapto-4-methyl - 5 - thiazolecarboxanilide. It was obtained in 95.5% yield as a cream solid melting at 122–124° C. after two recrystallizations from alcohol. Analysis gave 17.46% sulfur compared to 17.64% calculated for $C_{15}H_{17}N_5O_2S_2$.

Example 9

2-(p-nitrosopiperazinothio)-4-methyl - 5 - acetylthiazole from 2-mercapto-4-methyl-5-thiazolyl methyl ketone. It was obtained in 60% yield as a tan solid melting at 125–127° C. after recrystallization from ethyl alcohol. Analysis gave 19.00% nitrogen (Dumas) and 22.61% sulfur compared to 19.57% nitrogen and 22.39% sulfur calculated for $C_{10}H_{14}N_4O_2S_2$.

Example 10

2-(p-nitrosopiperazinothio)-4-methyl-5 - ethoxycarbonylthiazole from ethyl 2-mercapto-4-methyl-5-thiazolecarboxylate. It was obtained in 72.5% yield as an off-white solid melting at 88–89° C. after recrystallization from ethyl alcohol. Analysis gave 17.48% nitrogen (Dumas) and 20.28% sulfur compared to 17.71% nitrogen and 20.27% sulfur calculated for $C_{11}H_{16}N_4O_3S_2$.

It has long been known that nitrosamines retard the vulcanization of rubber. On the other hand, most of the new nitrosamines strongly accelerate the vulcanization of rubber, and all of them exert useful accelerating action. Compounds in which X of the azole ring is sulfur are much to be preferred for this purpose. However, 2-(p-nitrosopiperazinothio)benzoxazole is a useful contact herbicide whereas 2-(p-nitrosopiperazinothio)benzothiazole is innocuous to foliage. Some of the compounds are toxic to fungi and other microorganisms. For example, 2-(p-nitrosopiperazinothio)-4-methyl-5-acetylthiazole and 5-chloro-2-(p - nitrosopiperazinothio)benzothiazole were toxic to *Pythium ultimum* and prevented growth of the organism at a concentration of 30 parts per million. The former also prevented growth of *S. aureus* at one part per thousand. Insecticidal activity was observed with 6-ethoxy-2-(p-nitrosopiperazinothio)benzothiazole while gave 100% kill of mosquito larvae at a concentration of 10 parts per million.

Use as herbicides was illustrated by spraying 21-day old specimens of various grasses and broadleaf plants with an aqueous dispersion containing 0.5% of the test chemical. Fourteen days later results were observed and recorded according to the following contact rating code:

0 no phytotoxicity
1 slight phytotoxicity
2 moderate phytotoxicity
3 severe phytotoxicity
4 plant dead

| Test Plants | Phytotoxicity Ratings | |
|---|---|---|
| | 2-(p-nitrosopiperazinothio)-4-methylthiazole | 2-(p-nitrosopiperazinothio)benzoxazole |
| Morning glory | 4 | 4 |
| Sugar beet | 2 | 3 |
| Foxtail | 3 | 3 |
| Crab grass | 4 | 4 |
| Pigweed | 4 | 4 |
| Radish | 1 | 4 |
| Soybean | 1 | 2 |
| Tomato | 1 | 4 |

Under the same conditions pigweed was killed by spraying with 0.5% of 2 - (p - nitrosopiperazinothio)benzimidazole.

As a specific embodiment of the invention illustrating accelerating properties, a rubber base composition was compounded comprising:

| | Parts by wt. |
|---|---|
| Smoked sheets rubber | 100.0 |
| Carbon black | 50.0 |
| Zinc oxide | 5.0 |
| Stearic acid | 3.0 |
| Saturated hydrocarbon softener | 3.0 |
| Sulfur | 2.5 |
| Antioxidant | 1.0 |

To the base stock was added 0.5 part of accelerator and the composition cured by heating in a press for 45 minutes at 144° C. The modulus, tensile, and scorch properties are set forth below:

TABLE I

| Accelerator | Modulus in lbs./in.² at 300% Elongation | Tensile at Break in lbs./in.² | Mooney Scorch at 135° C. (mins.) |
|---|---|---|---|
| 2-(p-nitrosopiperazinothio)-4-methyl-5-anilinocarbonylthiazole | 2,230 | 3,100 | 13.7 |
| 5-chloro-2-(p-nitrosopiperazinothio)benzothiazole | 2,470 | 4,000 | 16.1 |
| 2-(p-nitrosopiperazinothio)benzothiazole | 2,500 | 4,100 | 15.5 |
| 2-(p-nitrosopiperazinothio)benzoxazole | 1,510 | 2,400 | 20.0 |
| 2-(p-nitrosopiperazinothio)-4-methylthiazole | 2,670 | 4,300 | 17.5 |
| 6-ethoxy-2-(p-nitrosopiperazinothio)benzothiazole | 2,260 | 3,600 | 13.9 |
| 2-(p-nitrosopiperazinothio)-4-methyl-5-acetylthiazole | 2,650 | 3,900 | 13.8 |
| 2-(p-nitrosopiperazinothio)-4-methyl-5-ethoxycarbonylthiazole | 2,560 | 4,000 | 16.3 |
| 2-(p-nitrosopiperazinothio)-4-methyl-5-carbamoylthiazole | 1,820 | 2,700 | 19.8 |

The accelerating properties and processing safety in the following stock further illustrate the invention:

| | Parts by wt. |
|---|---|
| Smoked sheets rubber | 100.0 |
| Carbon black | 50.0 |
| Zinc oxide | 5.0 |
| Stearic acid | 3.0 |
| Saturated hydrocarbon softener | 3.0 |
| N-nitrosodiphenylamine | 1.0 |
| Sulfur | 2.5 |
| Accelerator | 0.5 |

The compositions were vulcanized by heating for different periods of time in the usual manner in a press at 144° C. The physical properties of the vulcanizates and resistance of the unvulcanized compositions to scorch are set forth in Table II. The modulus and tensile properties are for the 60 minute cures and indicate that the new compounds possess useful accelerating properties. The scorch data indicate that the new accelerators possess an ample margin of processing safety augmented by the presence of a nitroso diaryl amine.

TABLE II

| Accelerator | Cure Time in Mins. | Modulus in lbs./in.² at 300% Elongation | Tensile at Break in lbs./in.² | Mooney Scorch at 135° C. (mins.) |
|---|---|---|---|---|
| 2-(p-nitrosopiperazinothio)-4-methyl-5-anilinocarbonylthiazole | 60 | 2,170 | 3,700 | 15.1 |
| 5-chloro-2-(p-nitrosopiperazinothio)-benzothiazole | 60 | 2,340 | 4,000 | 25.7 |
| 2-(p-nitrosopiperazinothio)benzothiazole | 60 | 2,420 | 4,000 | 30.9 |
| 2-(p-nitrosopiperazinothio)benzoxazole | 60 | 1,400 | 2,600 | 30.3 |
| 2-(p-nitrosopiperazinothio)-4-methylthiazole | 60 | 2,530 | 4,100 | 30.6 |
| 6-ethoxy-2-(p-nitrosopiperazinothio)-benzothiazole | 60 | 2,160 | 3,600 | 24.4 |
| 2-(p-nitrosopiperazinothio)-4-methyl-5-acetylthiazole | 60 | 2,480 | 3,900 | 18.9 |
| 2-(p-nitrosopiperazinothio)-4-methyl-5-ethoxycarbonylthiazole | 60 | 2,460 | 4,000 | 31.3 |
| 2-(p-nitrosopiperazinothio)-4-methyl-5-carbamoylthiazole | 60 | 2,000 | 3,200 | 24.6 |

Although the invention has been illustrated by specific embodiments, it is not limited thereto. For example, the new compounds may be used for the acceleration of other types of sulfur-vulcanizable rubbers. These rubbers comprise natural rubber in its various forms, as for example latex, crepe, smoked sheets, gutta-percha, balata, and cyclo rubbers. The new compounds are applicable generally for acceleration of natural and synthetic diene elastomers, as for example cis-polybutadiene, cis-polyisoprene, styrene-butadiene copolymer rubber, and polyisobutylene polymerized with a small proportion of a diene. The accelerator will generally be within the range of 0.1–3% of the rubber.

It is intended to cover all changes and modifications of the examples of the invention herein chosen for purposes of disclosure which do not constitute departure from the spirit and scope of the invention.

What is claimed is:

1. A compound of the formula

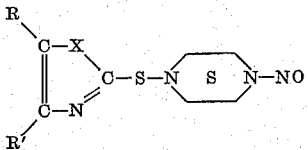

where X is selected from the group consisting of oxygen, sulfur, and NH, R is selected from the group consisting of hydrogen and lower alkyl, R' is selected from the group consisting of hydrogen, lower alkyl, acetyl, lower carboalkoxy, carbamyl, and carbanilino, and R and R' taken together with the vicinal carbon atoms of the azole ring constitute an arylene radical of the benzene series.

2. 2-(p-nitrosopiperazinothio)benzothiazole.
3. 5-chloro-2-(p-nitrosopiperazinothio)-benzothiazole.
4. 2-(p-nitrosopiperazinothio)benzoxazole.
5. 2-(p-nitrosopiperazinothio)-4-methylthiazole.
6. 2-(p-nitrosopiperazinothio)-4-methyl-5-ethoxycarbonylthiazole.
7. 2-(p-nitrosopiperazinothio)-4-methyl-5-acetylthiazole.
8. Method of vulcanizing rubber comprising heating sulfur-vulcanizable diene rubber with an accelerating amount of a compound of the formula

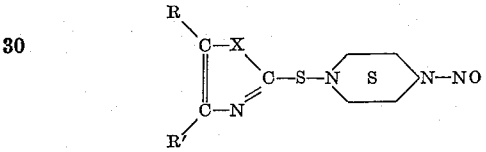

where X is selected from the group consisting of oxygen, sulfur, and NH, R is selected from the group consisting of hydrogen and lower alkyl, R' is selected from the group consisting of hydrogen, lower alkyl, acetyl, lower carboalkoxy, carbamyl, and carbanilino, and R and R' taken together with the vicinal carbon atoms of the azole ring constitute an arylene radical of the benzene series.

9. Method of vulcanizing rubber comprising heating sulfur-vulcanizable diene rubber with an accelerating amount of 2-(p-nitrosopiperazinothio)benzothiazole.

10. Method of vulcanizing rubber comprising heating sulfur-vulcanizable diene rubber with an accelerating amount of 2-(p-nitrosopiperazinothio)-4-methylthiazole.

11. Method of vulcanizing rubber comprising heating sulfur-vulcanizable diene rubber with an accelerating amount of 2-(p-nitrosopiperazinothio)-4-methyl-5-ethoxycarbonylthiazole.

12. Method of vulcanizing rubber comprising heating sulfur-vulcanizable diene rubber with an accelerating amount of 2-(p-nitrosopiperazinothio)-4-methyl-5-acetylthiazole.

No references cited.

JOSEPH L. SCHOFER, *Primary Examiner.*

D. K. DENENBERG, *Assistant Examiner.*